(12) United States Patent
Williams, Jr.

(10) Patent No.: US 10,531,052 B2
(45) Date of Patent: Jan. 7, 2020

(54) REAL-TIME SATELLITE IMAGING SYSTEM

(71) Applicant: Franklin H. Williams, Jr., Salt Lake City, UT (US)

(72) Inventor: Franklin H. Williams, Jr., Salt Lake City, UT (US)

(73) Assignee: Live Earth Imaging Enterprises, L.L.C., Salt Lake City, UT (US)

( * ) Notice: Subject to any disclaimer, the term of this patent is extended or adjusted under 35 U.S.C. 154(b) by 147 days.

(21) Appl. No.: 15/530,557

(22) Filed: Jan. 27, 2017

(65) Prior Publication Data

US 2018/0220107 A1  Aug. 2, 2018

(51) Int. Cl.
| H04N 7/18 | (2006.01) |
| H04N 5/378 | (2011.01) |
| H04N 5/225 | (2006.01) |
| G02B 23/12 | (2006.01) |
| G02B 3/00 | (2006.01) |

(52) U.S. Cl.
CPC ........... *H04N 7/185* (2013.01); *G02B 3/0056* (2013.01); *G02B 23/12* (2013.01)

(58) Field of Classification Search
CPC .... G02B 23/12; G02B 3/0056; H04N 5/2251; H04N 5/23206; H04N 5/23232; H04N 5/23238; H04N 5/3415; H04N 7/185
See application file for complete search history.

(56) References Cited

U.S. PATENT DOCUMENTS

| 4,121,159 A | 10/1978 | Lampert |
| 4,600,299 A | 7/1986 | Abshire |
| 4,634,882 A | 1/1987 | Craine |
| 4,710,619 A | 12/1987 | Haberl |
| 4,975,707 A | 12/1990 | Smith |
| 5,654,549 A * | 8/1997 | Landecker ............. G01C 11/02 250/332 |
| 5,793,230 A * | 8/1998 | Chu ....................... H03K 5/007 327/307 |
| 6,169,594 B1 * | 1/2001 | Aye ........................ G02B 5/045 349/196 |
| 6,185,037 B1 * | 2/2001 | Lutz ....................... G01C 11/02 359/399 |
| 6,201,232 B1 * | 3/2001 | Carlisle ................ G01C 11/025 250/206.2 |
| 6,555,803 B1 | 4/2003 | Bremer |

(Continued)

FOREIGN PATENT DOCUMENTS

EP        0 698 777        2/1996

OTHER PUBLICATIONS

Cappella Space website, www.cappellaspace.com.
(Continued)

*Primary Examiner* — Sath V Perungavoor
*Assistant Examiner* — Yong Joon Kwon
(74) *Attorney, Agent, or Firm* — Thomas Nello Giaccherini

(57) ABSTRACT

Methods and apparatus for Real-time Satellite Imaging System (10) are disclosed. More particularly, one embodiment of the present invention an imaging sensor (14) on a geostationary satellite having one or more co-collimated telescopes (18). The telescopes (18) illuminate focal planes (22) which are sparsely populated with focal plane arrays (24). The focal plane arrays (24) record the entire observable Earth hemisphere at one time, at least once every ten seconds, or more often.

6 Claims, 15 Drawing Sheets

(56) References Cited

U.S. PATENT DOCUMENTS

| | | | |
|---|---|---|---|
| 7,420,612 B2 * | 9/2008 | Tsujino | H04N 5/2353 |
| | | | 348/345 |
| 7,468,740 B2 | 12/2008 | Han | |
| 8,238,903 B2 | 8/2012 | Korb | |
| 8,360,367 B2 | 1/2013 | Korb | |
| 8,840,036 B2 | 9/2014 | Bosterling et al. | |
| 9,132,925 B2 | 9/2015 | Korb | |
| 9,188,438 B2 | 11/2015 | Fraisse | |
| 9,189,451 B1 | 11/2015 | Freedman | |
| 9,284,074 B2 | 3/2016 | Hofschuster | |
| 9,513,166 B2 | 12/2016 | Marchant | |
| 9,552,518 B2 | 1/2017 | Chen | |
| 9,741,840 B1 | 8/2017 | Moens et al. | |
| 2002/0041328 A1 * | 4/2002 | LeCompte | G01C 11/025 |
| | | | 348/144 |
| 2009/0268983 A1 | 10/2009 | Stone | |
| 2014/0002675 A1 * | 1/2014 | Duparre | H04N 17/002 |
| | | | 348/187 |
| 2014/0176710 A1 * | 6/2014 | Brady | G02B 27/0025 |
| | | | 348/144 |
| 2016/0056785 A1 * | 2/2016 | Wolfe | G01J 1/18 |
| | | | 250/340 |
| 2017/0169797 A1 * | 6/2017 | Lundberg | G09G 5/10 |

OTHER PUBLICATIONS

Douglass, Demonstration of an optically-butted infrared sensor, SPIE, 1989, vol. 1059, p. 180.
Hirschberg, Scanning or staring infrared imagers—a review of the issues, SPIE, 1985, vol. 591, 1985.
Blue Marble, Eastern Hemisphere, NASA website, earthobservatory. nasa.gov, Aug. 21, 2014.
Con, Why is there no live stream of the entire Earth spinning? www.quora.com, Mar. 11 (no year given).
Rogers, Adaptive coded aperture imaging, non-Imaging, and unconventional imaging sensor systems, SPIE, vol. 7468, Aug. 2, 2009.
Trott, Giant Binoculars, davetrott.com, (no date given).
Zamanifekri, A unified approach for the design of focal-plane arrays in satellite communication, 34th ESA Antenna Workshop, Oct. 3, 2012.

* cited by examiner

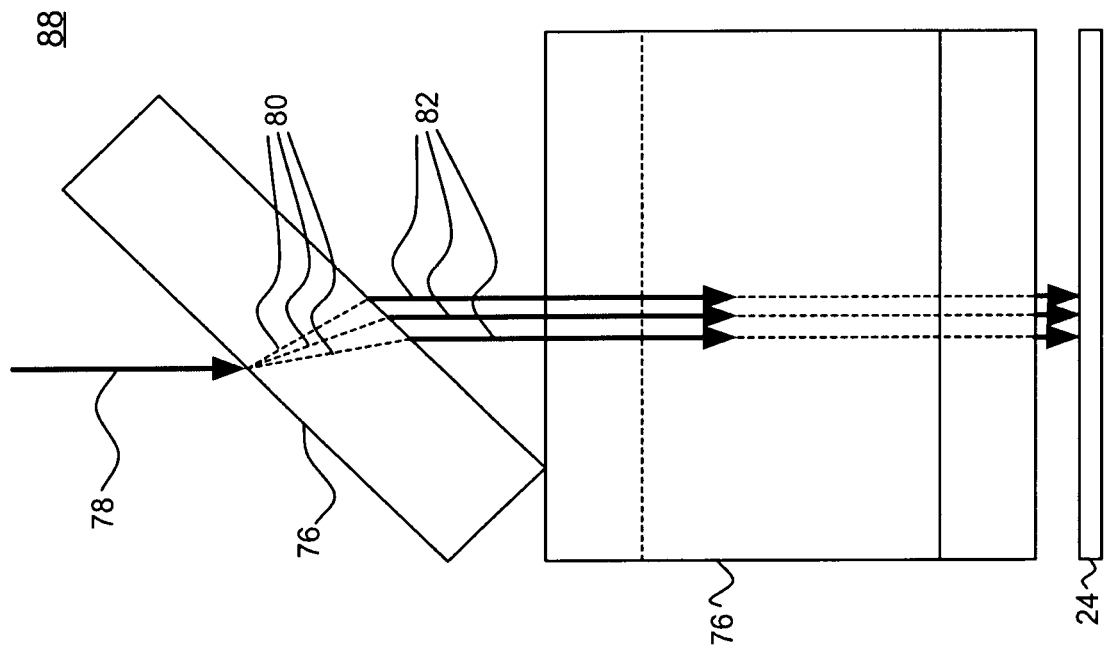
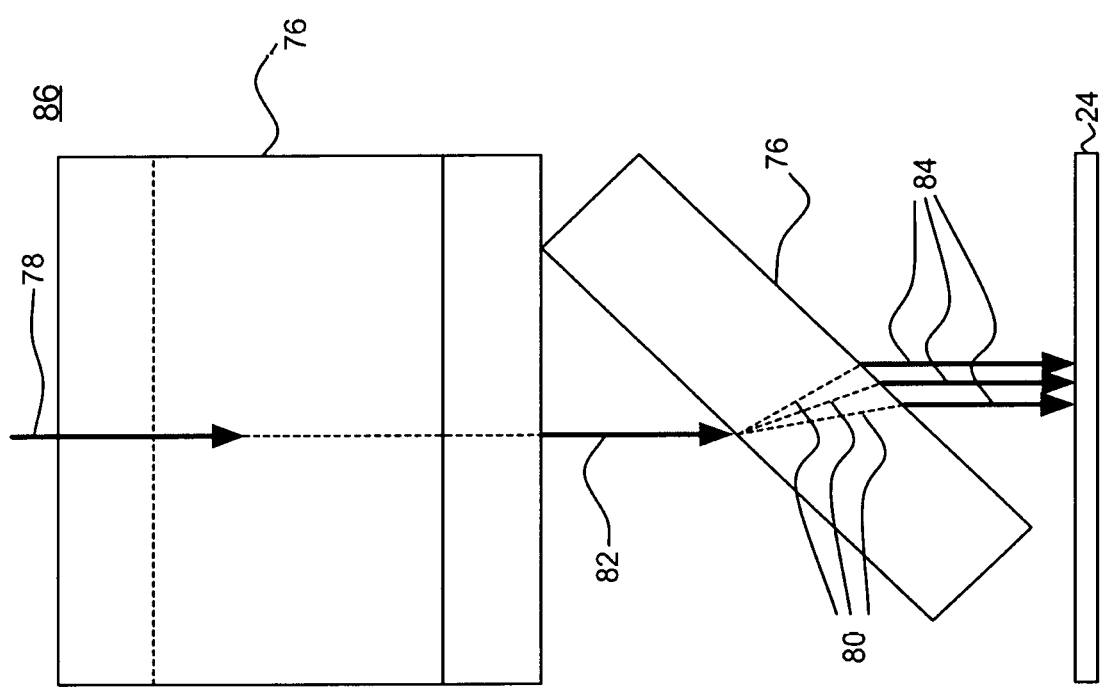

REAL-TIME SATELLITE IMAGING SYSTEM

CROSS-REFERENCE TO A RELATED PENDING PATENT APPLICATION & CLAIM FOR PRIORITY

The Present Non-Provisional Patent Application is related to U.S. Provisional Patent Application No. 62/298,347, filed on 22 Feb. 2016. The Applicant hereby claims the benefit of priority under Title 35, Sections 119 and/or 120, for any subject matter which is common to both the Present Non-Provisional application and U.S. Ser. No. 62/298,347.

FIELD OF THE INVENTION

One embodiment of the present invention relates to methods and apparatus for producing high quality, Real-time images of the Earth from a satellite in geosynchronous orbit. More particularly, one embodiment of the invention pertains to satellite imaging sensors and methods for generating recording, distributing, and displaying high-resolution images of a full visible hemisphere of the Earth in real-time.

FEDERALLY SPONSORED RESEARCH OR DEVELOPMENT

None.

BACKGROUND OF THE INVENTION

Currently available satellite based imaging sensors provide images of an entire hemisphere of the Earth, but these images are delayed by minutes, or even tens of minutes. Current satellites produce images of an entire hemisphere at moderate to low resolution, specifically, of five hundred meters to four kilometers per pixel. In some cases, conventional satellites provide images of small regions at high resolution delayed by tens of minutes, or even days. Over the last forty-five years, since the first weather monitoring satellite was placed in geostationary orbit (GSO), various satellite systems have been used to monitor features in the Earth and in the Earth's atmosphere.

Current commercial satellites are unable to produce Real-time images of a full hemisphere of the Earth due to the limitations imposed by their conventional design.

FIG. 1 offers a schematic view of the prior art, which includes a scanning mirror SM on a satellite in orbit. The scanning mirror SM collects light L from the Earth's surface ES, and directs it to imaging optics IO. The output from the imaging optics IO illuminates a conventional focal plane FP, which produces an electronic signal that is used to form an image.

FIG. 2 reveals another schematic view of the prior art. Conventional satellites may scan the observable Earth disk ED. Many scans SC1, SC2, SC3 through SCN, are generated in a sequential South to North fashion to produce an image of a full hemisphere. Non spinning satellites scans must include a scan retrace SR.

Conventional satellite imaging systems use scanning sensors, and produce images according to the method shown in FIG. 2.

The fastest satellite imaging system is the U.S. GOES-R weather satellite, and is planned for operation in 2017. The GOES-R uses a scanning sensor, and requires a minimum of five minutes to generate the scans that are then utilized to produce a full hemisphere image scanning sensors The GOES-R full hemisphere image is downlinked and transferred into a data processing center at NASA's Goddard Space Center, where it is processed for several minutes. The processed image is then sent back up to the GOES-R satellite, which relays the image to users within the observable hemisphere (predominantly North and South America). This entire process takes about ten minutes.

A satellite which would be able to produce an image of a full hemisphere of the Earth would provide "persistent" imaging. These images would be extremely useful, especially in the fields of weather monitoring forecasting.

No conventional commercial satellite currently provides persistent imaging, defined as once every thirty seconds or more often, of an entire observable hemisphere. No current satellite provides high resolution of one hundred meters per pixel resolution in real-time.

The development of a system that enables remote access using mobile devices over trusted and secure links to these networks would be a major technological advance, and would satisfy long-felt needs in the satellite and telecommunications industries.

SUMMARY OF THE INVENTION

One embodiment of the present invention includes an imaging sensor on a geostationary satellite having one or more co-collimated telescopes. The telescopes illuminate focal planes which are sparsely populated with focal plane arrays. The focal plane arrays are capable of recording the entire observable Earth hemisphere at one time, at least once every second or more often. Images are then transmitted to a user on Earth, who may observe the images in less than ten seconds after the recorded event happens on the surface of the Earth. This method provides persistent imaging of the Earth.

One embodiment of the present invention produces images within ten seconds from the time the event happens on the Earth. One embodiment of the invention is capable of making global observations of the Earth at one hundred meter scale or better spatial resolutions at nadir in real-time. In one particular implementation of the invention includes an imaging sensor on a geostationary satellite which is equipped with one or more co-collimated telescopes. The telescopes illuminate focal planes which are sparsely populated with focal plane arrays. The focal plane arrays are capable of recording the entire observable Earth hemisphere at one time, at least once every second or more often. Images are then transmitted to a user on Earth, who may observe the images in less than ten seconds after the recorded event happens on the surface of the Earth. This method provides persistent imaging of an entire visible hemisphere of the Earth.

An appreciation of the other aims and objectives of the present invention, and a more complete and comprehensive understanding of this invention, may be obtained by studying the following description of a preferred embodiment, and by referring to the accompanying drawings.

A BRIEF DESCRIPTION OF THE DRAWINGS

FIG. 1 exhibits the prior art, which employs a scanning mirror to direct light collected from the Earth's surface into imaging optics, and then onto a focal plane.

FIG. 2 depicts the prior art, and shows the observable Earth disc.

FIG. 3 provides a schematic overview of one embodiment of the invention, which includes a satellite equipped with an array of image sensors and a transmitter.

FIG. 4 supplies a schematic overview of one embodiment the present invention, which includes an imaging sensor.

FIG. 5 furnishes a schematic overview of one portion of one embodiment of the present invention, which includes a single co-collimated telescope.

FIG. 6 offers a schematic overview of an alternative embodiment of a single co-collimated telescope.

Figure 10:
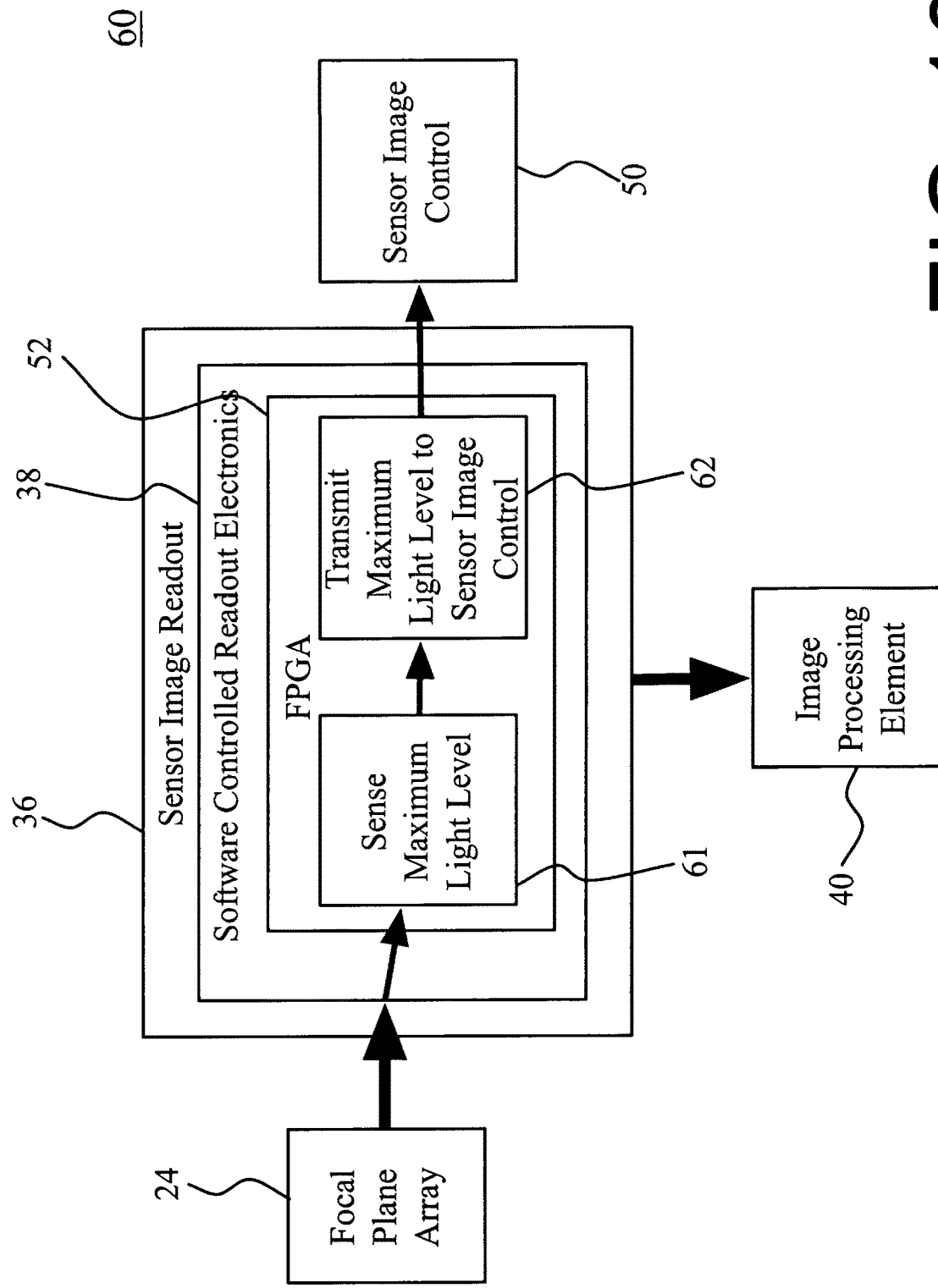

FIG. 10 offers a functional block diagram of the readout of each focal plane array.

Figure 11:
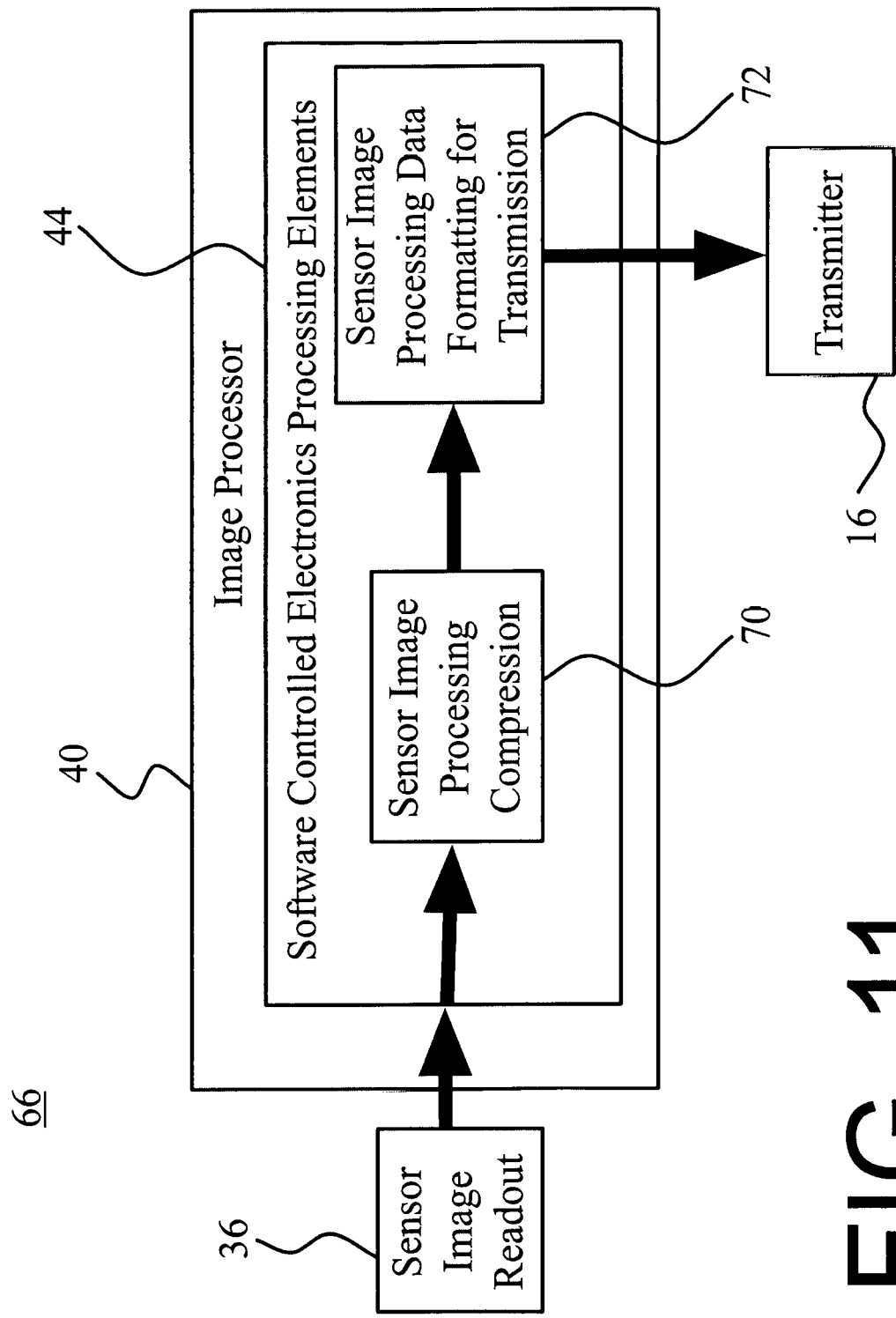

FIG. 11 furnishes a functional block diagram of a method of processing images and data from the sensor image readout by the image processing element.

Figure 12:
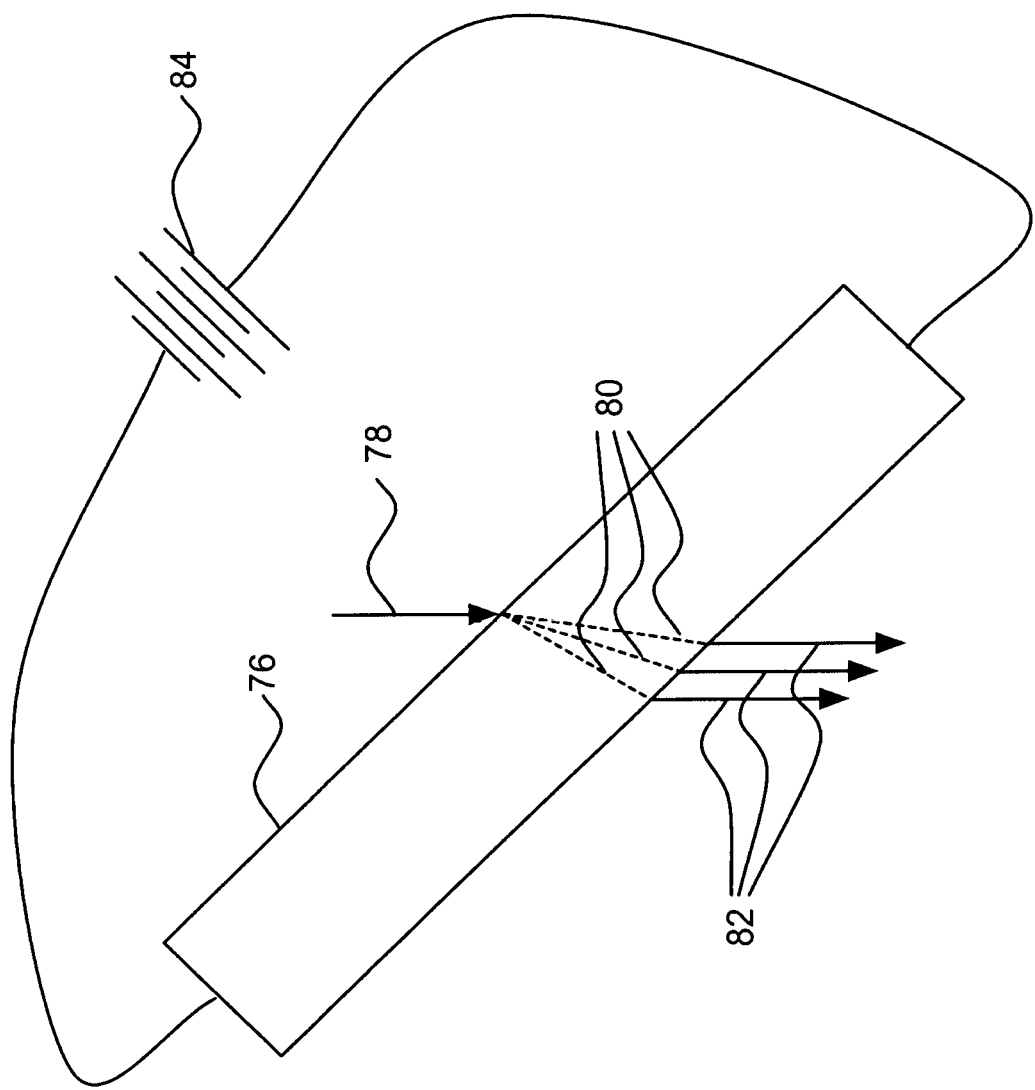

FIG. 12 shows a plate, which is made from a material having an electrically reactive high index of refraction.

FIGS. 13A and 13B provide schematic diagrams of one embodiment of a pair of electrically reactive high index of refraction material plates.

Figure 14:
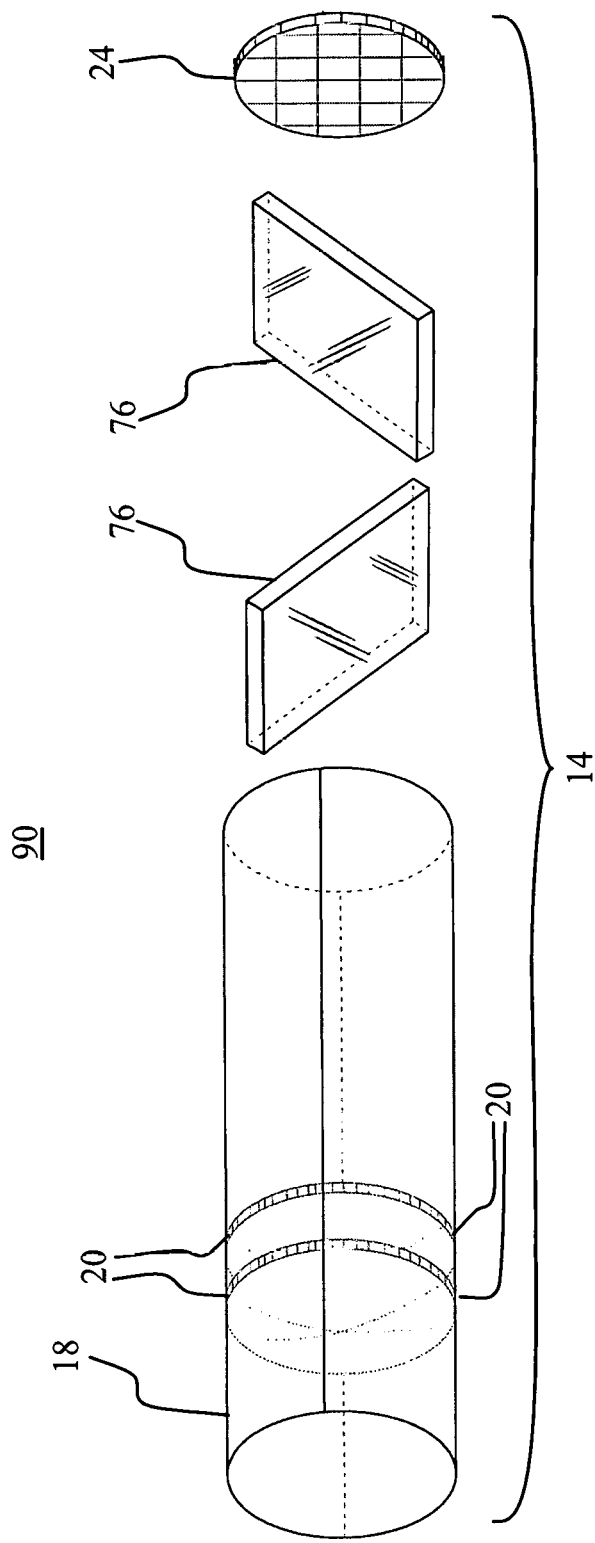

FIG. 14 is a schematic diagram of one embodiment of an imaging sensor showing a telescope and optical elements.

Figure 15:
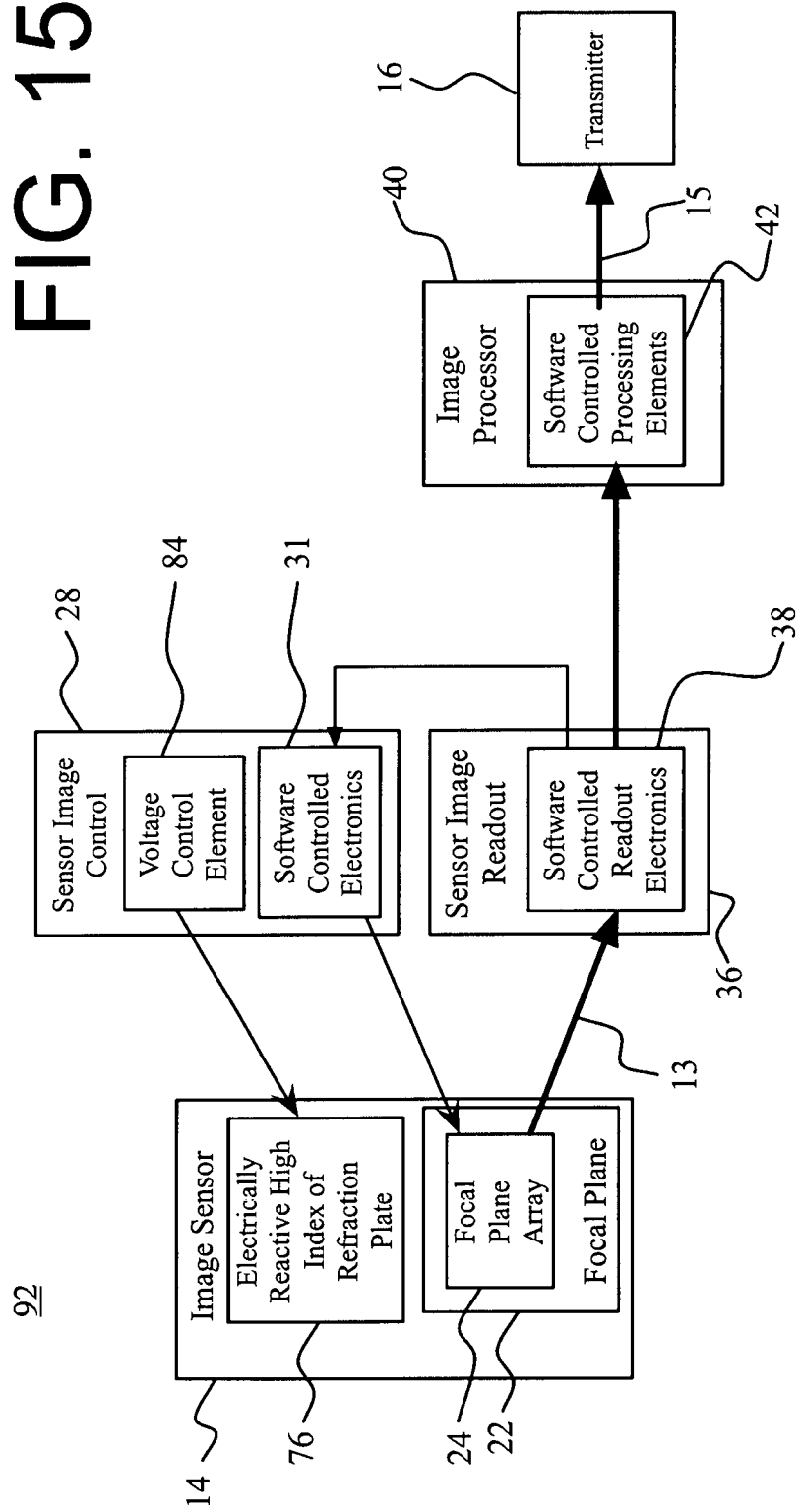

FIG. 15 is a functional block diagram of the data and control flow between the image sensor and a software controlled focal plane array.

A DETAILED DESCRIPTION OF PREFERRED & ALTERNATIVE EMBODIMENTS

I. Overview of the Invention

Figure 1:
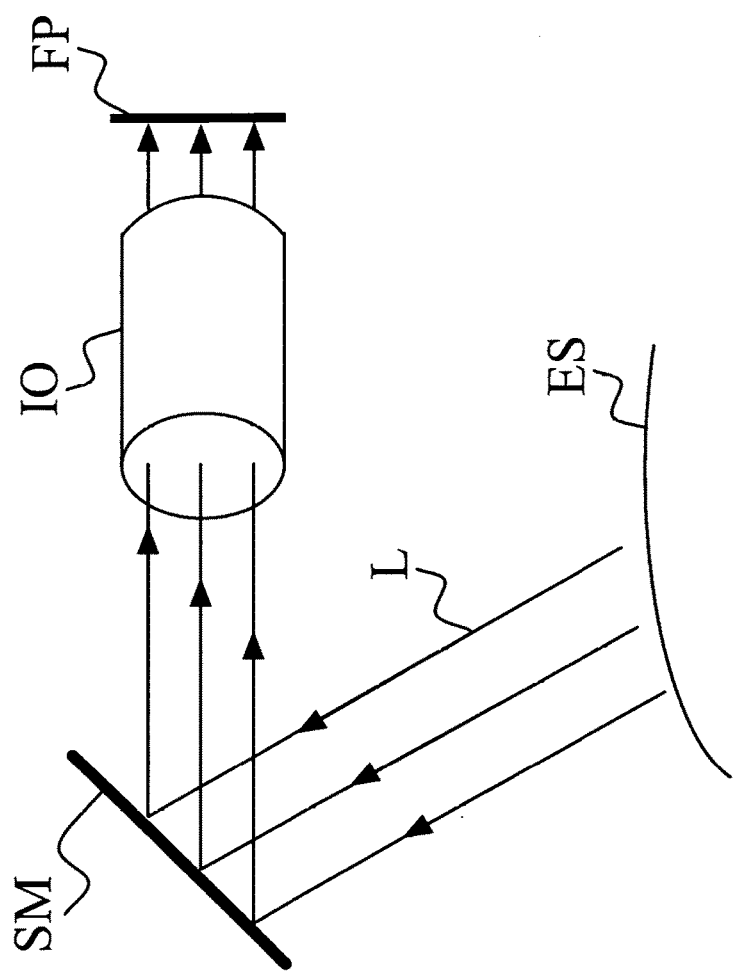
Figure 2:
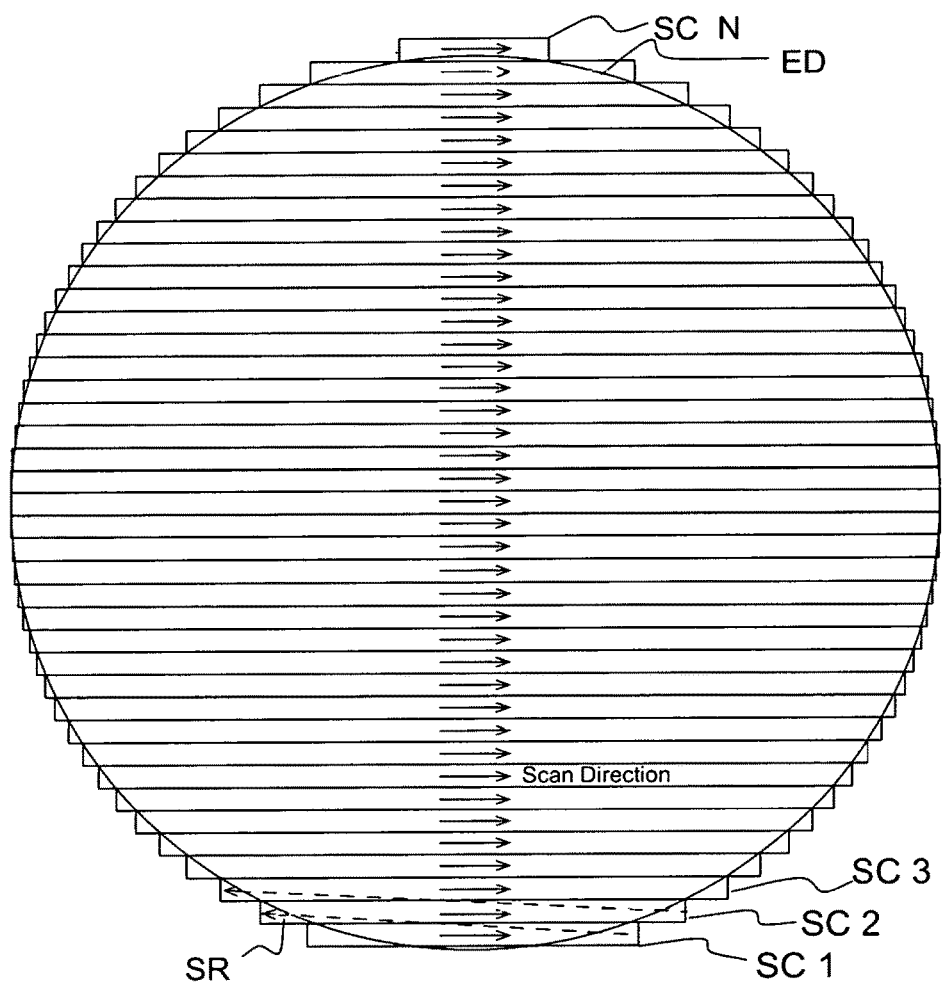
Figure 3:
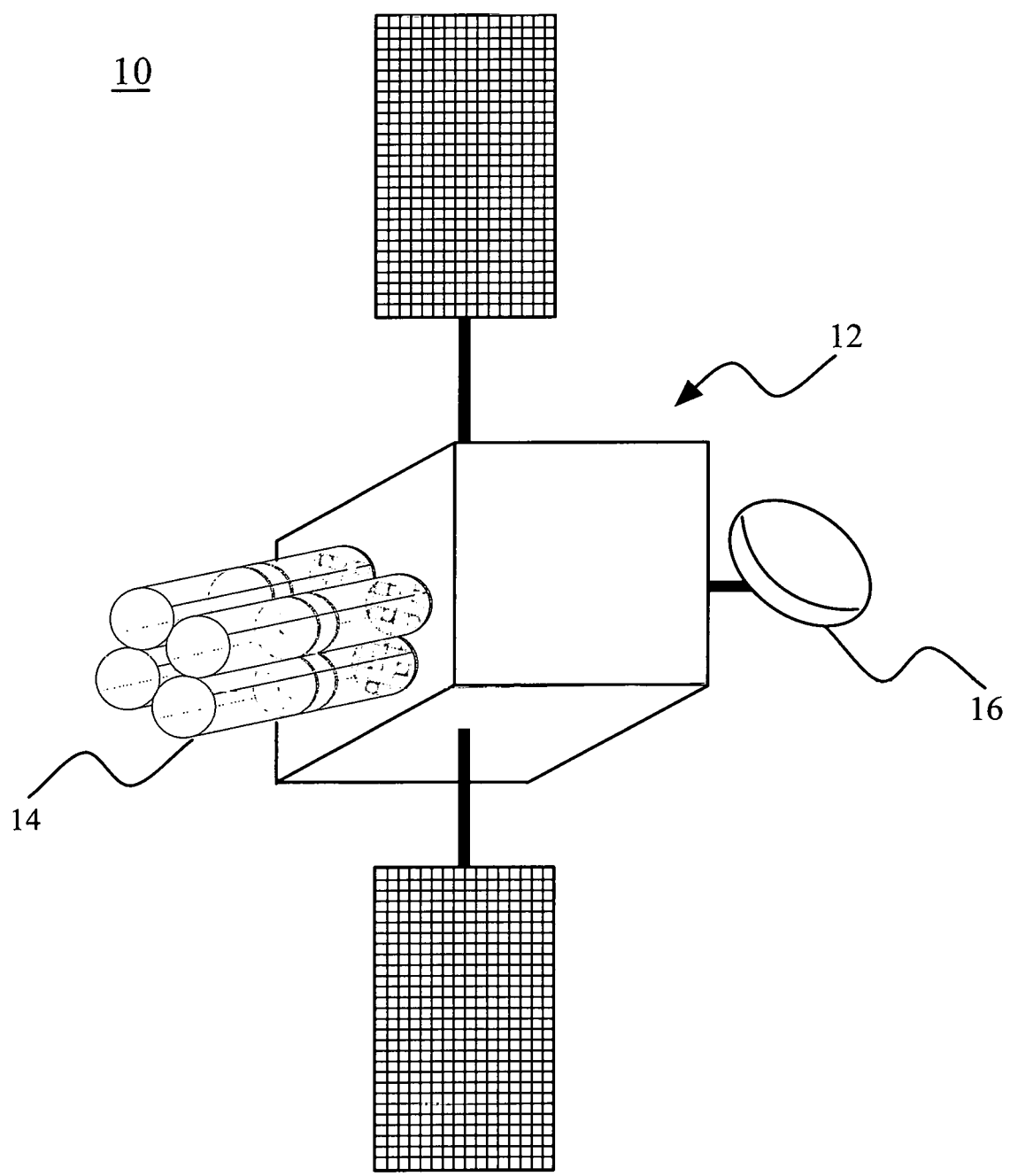

FIG. 3 offers a schematic view the Real-time Satellite Imaging System 10, which includes a satellite 12 equipped with an image sensor 14 and a transmitter 16. This particular embodiment of the present invention is a geostationary satellite.

A geostationary satellite appears to remain motionless in orbit, because its orbit keeps it over the same region of the Earth's surface. In this way, the motions of the Earth and the satellite are nulled. The geostationary orbit is contained in the Earth's Equatorial plane, and the revolution rate of the satellite in its orbit is the same as the rotational rate of the Earth.

The GSO is a distinct and specific subset of geosynchronous Earth orbit (GEO). A GEO orbit only has to be over the exact same spot on the Earth's surface once per day (i.e., that the satellite's orbit is synchronous with the Earth's rotation), while GSO orbits are such that the satellite appears to be continuously stationary in the sky above a specific spot on the Earth's Equator. Accordingly, consistent images may be taken of a portion of the Earth's surface and atmosphere that fall within the hemisphere of the Earth viewable by the GSO satellite, i.e, the observable hemisphere, which are typically referred to as the "footprint of the satellite." The observable hemisphere is not a full geographic hemisphere, i.e., not 50% of the Earth, as the GSO is too close to the Earth to see the extreme polar regions of the Earth, i.e., above +81.3 degrees latitude or below −81.3 degrees latitude.

II. A Detailed Description of One Preferred Embodiment of the Invention

Figure 4:
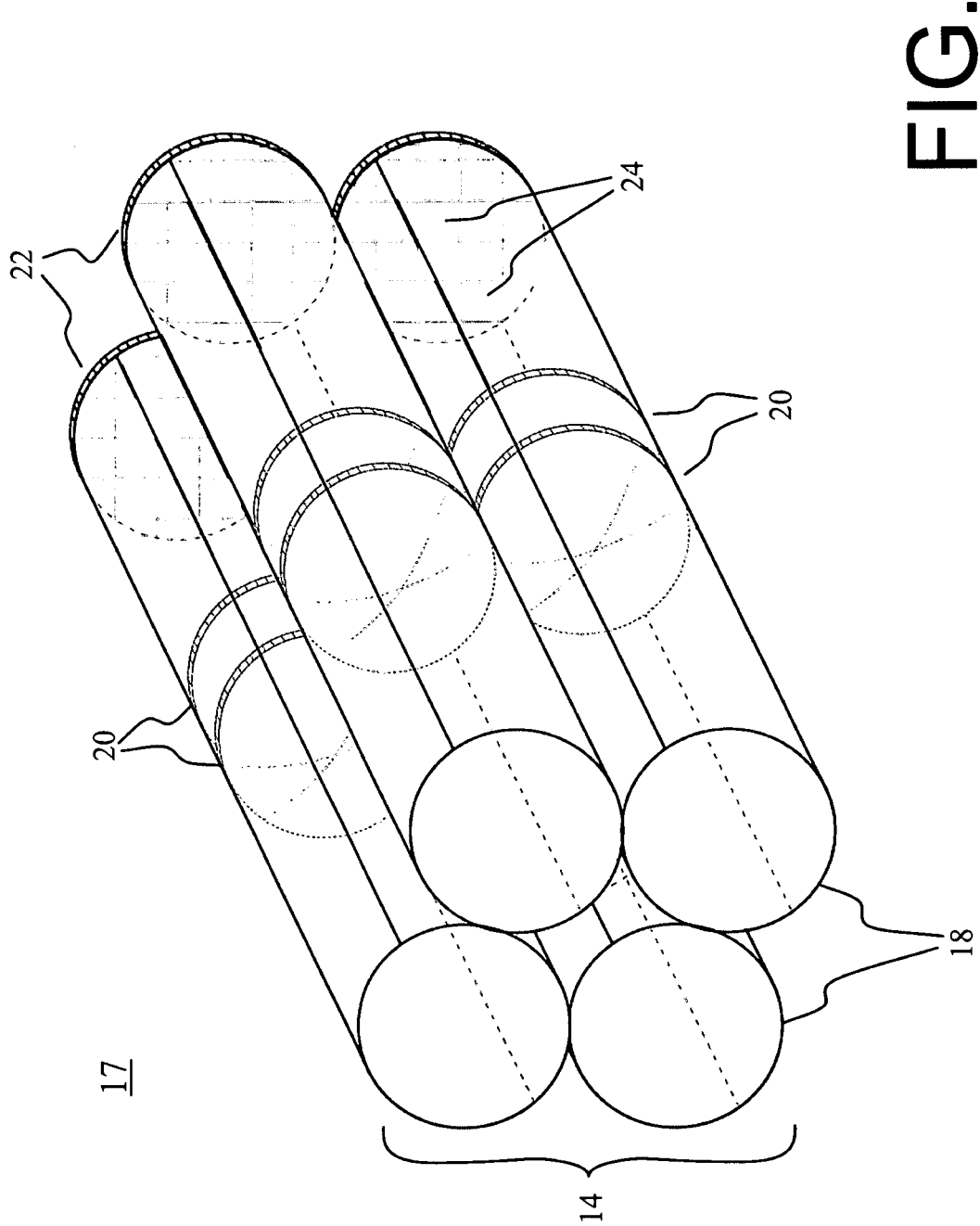

FIG. 4 furnishes a schematic diagram 17 of one embodiment of the image sensor 14. This embodiment includes four co-collimated telescopes 18, which each include refractive elements 20 focusing onto four focal planes 22, one for each co-collimated telescope 18. FIG. 4 shows focal plane arrays 24. Alternative embodiments of the invention may include any number of telescopes, focal planes and focal plane arrays that include two or more of each.

Figure 5:
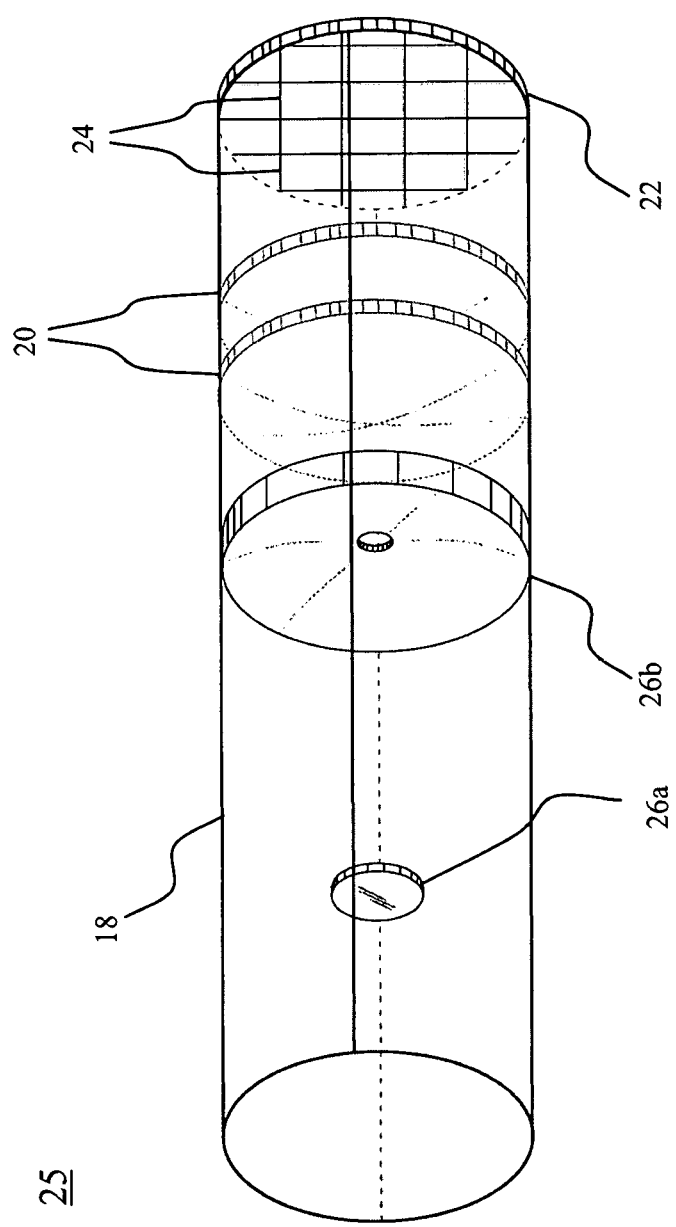

FIG. 5 supplies a schematic diagram 25 of one embodiment of a single co-collimated telescope 18, which includes both reflective elements 26 and refractive elements 20 focusing onto a focal plane 22, which includes focal plane arrays 24.

Figure 6:
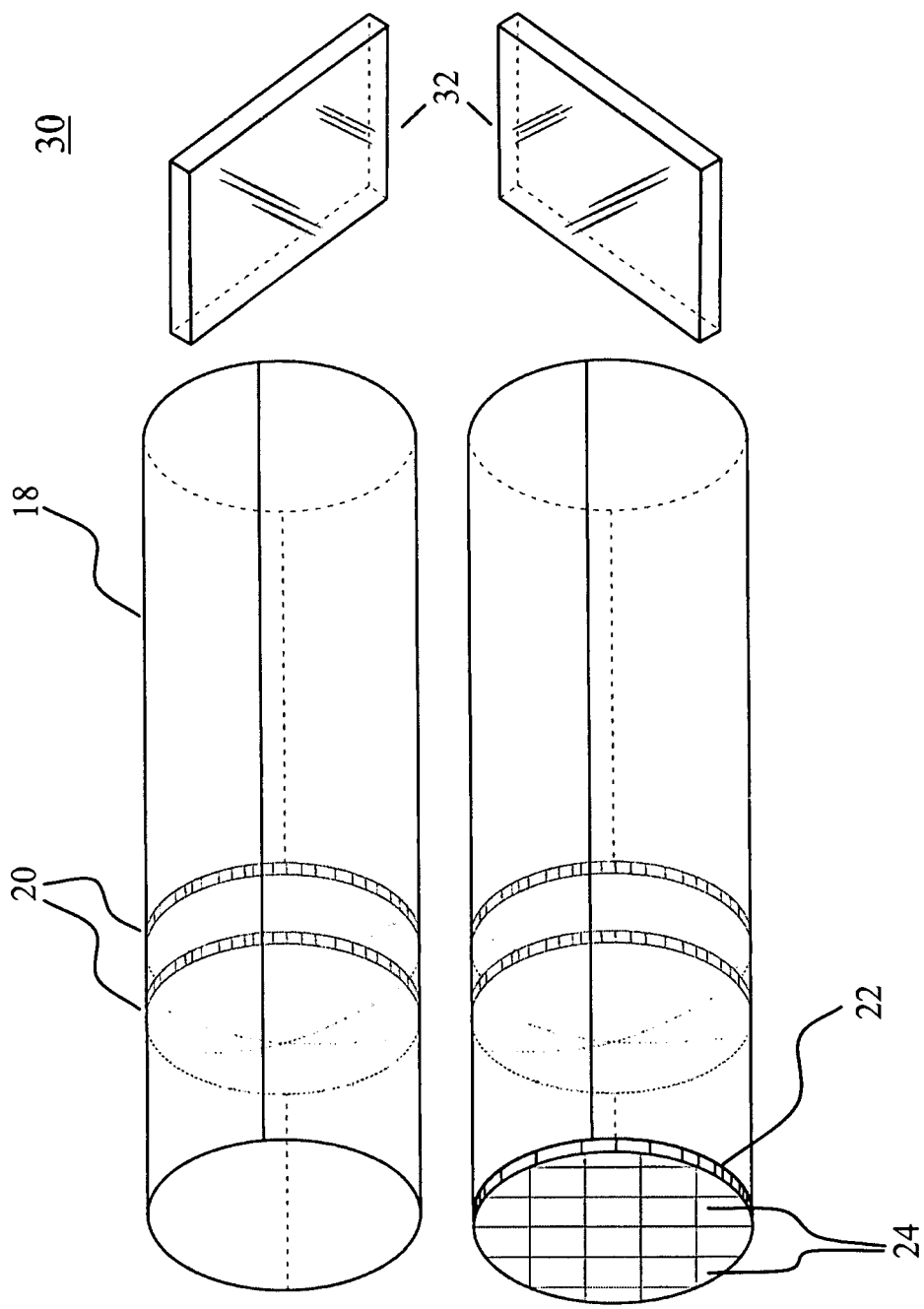

FIG. 6 is a schematic diagram 30 of one alternate embodiment of a single co-collimated telescope 18, which includes refractive elements 20 focusing onto a focal plane 22, which includes focal plane arrays 24. Two folding mirrors 32 are shown at the end of the telescopes, opposite the end containing the focal plane arrays 24.

Figure 7:
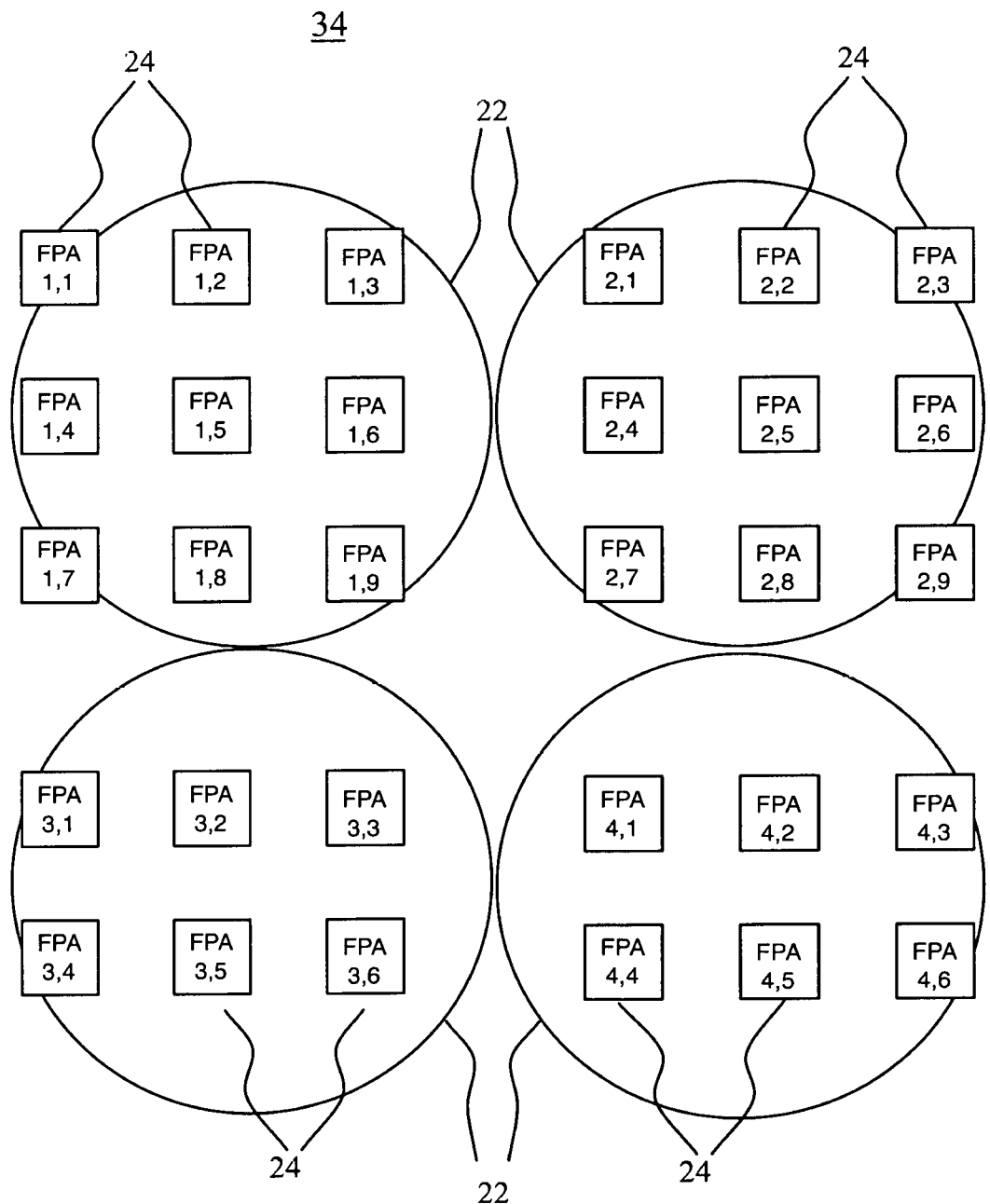
FIG. 7 is a schematic overview of four focal planes.

FIG. 7 depicts a schematic diagram 34 of four focal planes 22 showing the sparse layout of focal plane arrays 24 across resulting from the four co-collimated telescopes 18 shown in FIG. 4.

Figure 8:
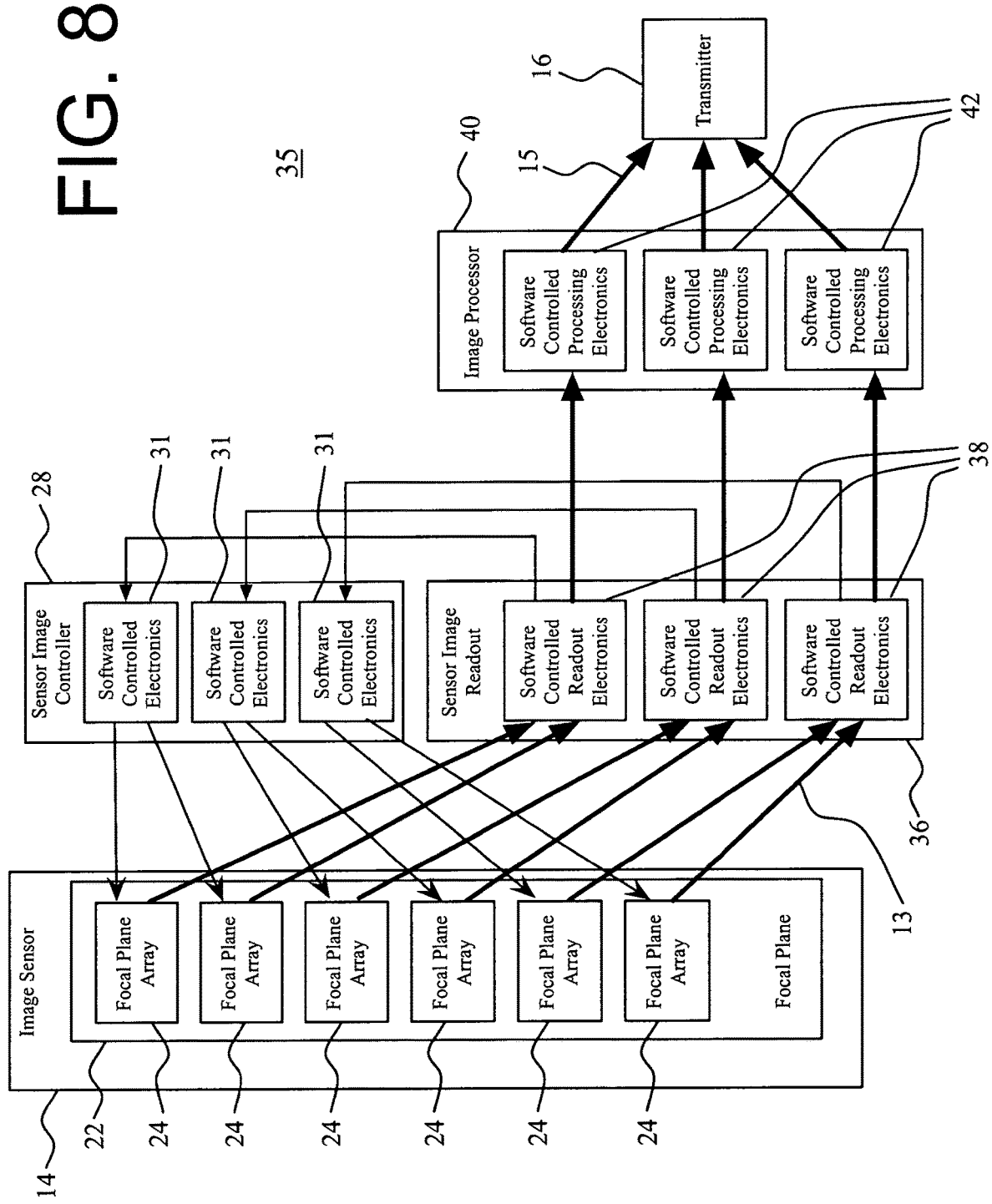
FIG. 8 is a functional block diagram of the data and control flow between the image sensors and its corresponding focal plane.

FIG. 8 portrays a functional block diagram 35 of the data 13 and control flow among the image sensors 14 and various electronic components. The image sensors 14 each include a number of focal planes 22. Each focal plane 22 contains a number focal plane arrays 24. The focal plane arrays 24 are all connected to and controlled by a sensor image controller 28. The sensor image controller 28 uses software controlled electronics 31 to control the operations of each of the focal plane arrays 24. The focal plane arrays 24 are read out by the sensor image readout 36, which includes the software controlled readout electronic elements 38. The images and data from the focal plane arrays 24 are transferred to an image processor 40, which includes software controlled processing electronic elements 42. The software controlled readout electronics elements 38 transfers data to the software controlled electronics 31 of the sensor image controller 28 to optimize control functions. The software controlled processing electronic elements 42 of the image processor 40 transfer processed images 15 to transmitter 16.

Figure 9:
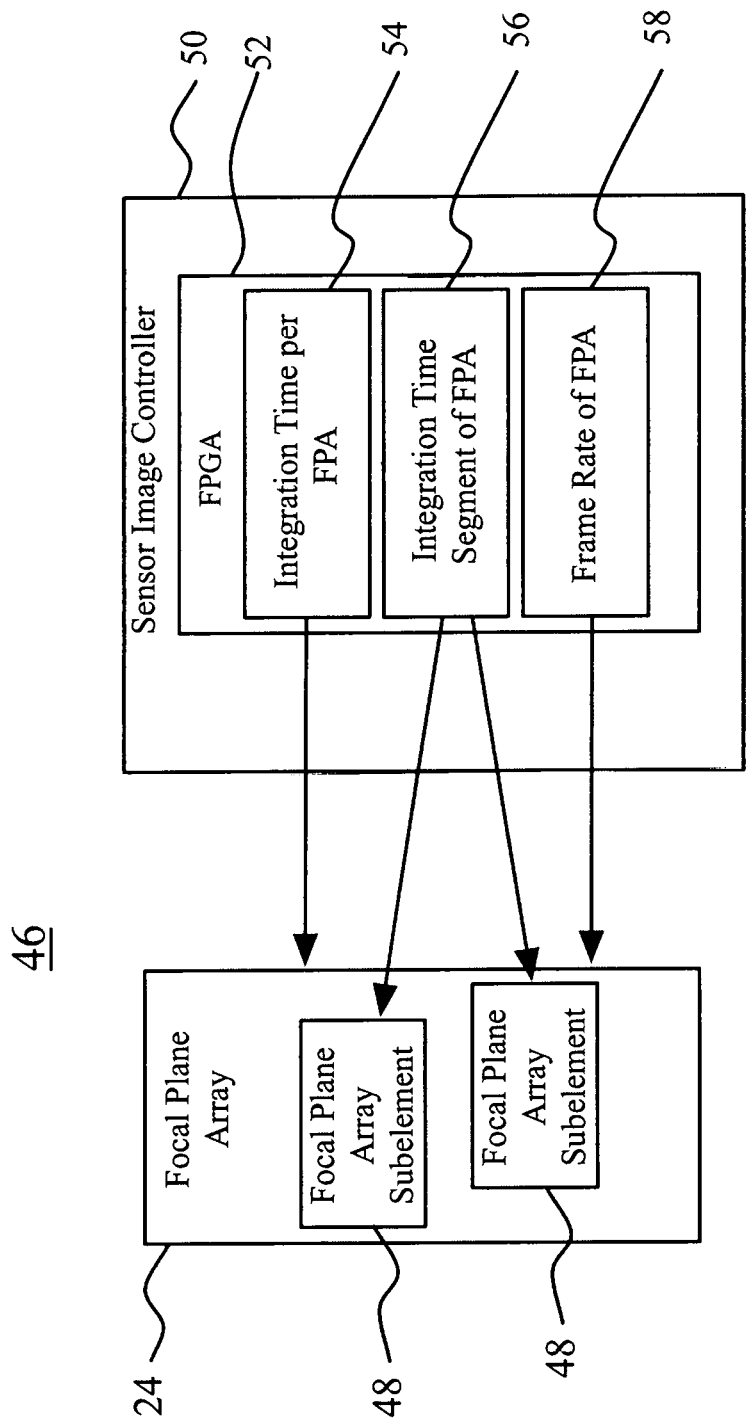
FIG. 9 is a functional block diagram of control devices for each focal plane array.

FIG. 9 is a functional block diagram 46, which illustrates the method of the control of each focal plane array 24. Each focal plane array 24 includes focal plane array sub-elements 48. Each focal plane array 24 is controlled by a FPGA elements 52 within the sensor image controller 50 with sub-elements of the FPA 48 controlled by sub-elements of the FPGA 56, with FPGA sub-elements 54 and 58 controlling a full FPA, which as a set perform the following functions:

control integration time per FPA 54;
control integration time segment of FPA 56; and
control frame rate of FPA 58.

FIG. 10 is a functional block diagram 60 of that shows the readout of each focal plane array 24 by the sensor image readout 36. Data is readout by the software controlled readout electronics 38, which includes a number of field programmable gate arrays 52. Each field programmable gate array 52 includes a sensor image readout that senses a maximum light level 61 and a sensor readout that transmits a maximum light level 62 to the sensor image control 50 to optimize image capture. Sensor image readout 36 transfers images and data from the focal plane array 24 to the image processing element 40.

FIG. 11 supplies a functional block diagram 66 of a method, which is used to process images and data from the sensor image readout 36 by the image processor 40. The image processor 40 includes software controlled electronics processing elements 44. The software controlled electronics processing elements 44 contain several modules for imagery and data processing including sensor image processing compression 70 and sensor image processing data formatting 72. The output of the sensor image processing data formatting 72 is conveyed to the transmitter 16.

FIG. 12 is a view 74 a plate 76. In this embodiment, the plate 76 is formed from an electrically reactive high index of refraction material. Incident light beams 78 illuminate the plate 76. The incident light 78 move through the plate 76, and propagates along any of multiple paths 80 to produce exiting rays 82, depending on the level of voltage placed across the plate 76 by voltage control element 84.

FIGS. 13A and 13B reveal schematic diagrams 86 and 88 of one embodiment of a pair of electrically reactive high index of refraction material plates 76. The plates 76 are shown oriented in two different directions, which allow the incident light rays 78 to change the shift of the exiting rays 84 in two dimensions through two shifts through electrically reactive high index of refraction material plates 76 each shown 80 with the first shift shown 82 and doubly shifted 84. Each dimension corresponds to one the electrically reactive high index of refraction material plates 76, and allows a resulting image formed on each focal plane array 24 to be actively shifted in two dimensions.

FIG. 14 offers a schematic diagram 90 of one embodiment of an imaging sensor 14 showing a telescope 18, which includes refractive elements 20, and a pair of electrically reactive high index of refraction material plates 76 that produce an image on focal plane array 24.

FIG. 15 exhibits a functional block diagram 92 of the data and control flow among an image sensor 14, a sensor image controller 28, a sensor image readout 36, an image processor 40 and a transmitter 16. The image sensor 14 includes a focal plane 22, which further includes a focal plane array 24. The image sensor 14 also includes an electrically reactive high index of refraction material plate 76. The image sensor 14 is connected to and controlled by the sensor image controller 28. The sensor image controller 28 includes a voltage control element 84 and software controlled electronics 31. The sensor image controller 28 is also connected to a sensor image readout 36, which includes software controller readout electronics 38, which reads out data 13. The output of the sensor image readout 36 is transferred to the image processor 40 containing software controlled processing elements 42 which in turn transfers processed the imagery and data 15 to the transmitter 16.

The present invention uses a novel combination of elements to produce full hemisphere images in only thirty seconds or less.

The present invention uses a "fractionated sensor" to take the hemispherical images all at once.

According to the present invention, the minimum time to take a full observable hemispherical image is about one-fifth of a second. The present invention accomplishes this task by employing a novel combination of multiple telescopes, focal planes, and focal plane arrays as described above in the Detailed Description Section.

The present invention does not "build up" or accumulate a full hemisphere image by using a scanning sensor. The image produced by the present invention is assembled simultaneously with multiple, imaging two-dimensional focal plane arrays an at the same time.

According to the present invention, the entire process, which begins when an event occurs, to the delivery to a user requires less than ten seconds.

One embodiment of the present invention may be described as a series of events, as recited in Table One:

TABLE ONE

Event happens
Light travels from the event to the satellite sensor
Light is captured by the sensor and stored as voltages
Voltages are read out of the sensor focal plane arrays, and processed on the satellite for transmission
Data are transmitted to the ground
The ground station receives the data stream and "unpacks" the data, and sends it to the ground processing site
The ground processing site takes the raw data and turns in into images
In parallel, the ground processing site extracts selected data from the images
The composed images are transferred to storage (for future use) and the distribution system
The distribution system (Internet, other communications satellites, etc.) delivers the live images to the user

III. Alternative Embodiments

The present invention may be implemented in a wide variety of embodiments. Alternative embodiments include, but are not limited to:

An imaging satellite with an image sensor including a focal plane array consisting of a charge coupled device (CCD) array An imaging satellite with an image sensor including a focal plane array consisting of a complementary metal-oxide-semiconductor (CMOS) array An imaging satellite with an image sensor including a focal plane array consisting of a scientific CMOS (SCMOS) array An imaging satellite with an image sensor including a focal plane array consisting of a micro-bolometer (µ-bolometer) array An imaging sensor with a focal plane array using a 2×2 2×3, 2×4, 3×3, 3×4, or 4×4 array of pixels with different filters to allow for the creation of full color imagery An imaging sensor with a focal plane array using a stacked sensor such that it is capable of recording color in each individual pixel, e.g., a FOVEON Array An imaging sensor with a primary image sensor comprised an optical train illuminating a focal plane array An imaging sensor with primary image sensor comprised of a single optical train directly illuminating an optical beam splitters such that each split is for a different frequency and each split frequency illuminates a focal plane array An imaging sensor comprised of a single optical train directly illuminating a diffraction grating such that each different frequency illuminates a focal plane arrays An imaging sensor comprised of multiple co-collimated optical trains each directly illuminating a focal plane array as part of a matrix of focal plane arrays An imaging sensor comprised of multiple co-collimated optical trains each directly illuminating a series of one or more optical beam splitters such that each split is for a different frequency and each split frequency illuminates a focal plane array An imaging sensor observing and recording imagery and data of a cooperative target in real-time An imaging sensor observing and recording imagery and data of a target on the Earth An imaging sensor observing and recording imagery and data of a target in the Earth's atmosphere An imaging sensor wherein a cooperative target is data linked to the satellite's primary ground station An imaging sensor wherein the cooperative target is data linked to the satellite An imaging sensor observing and recording imagery and data of a target in the Earth's orbit An imaging sensor observing and recording imagery and data of a target in space out of the Earth's orbit An imaging sensor wherein the cooperative target is data linked to the satellite's primary ground station An imaging sensor wherein the cooperative target is data linked to the satellite An imaging sensor wherein the imagery and data allows determination of the characteristics of a non cooperative target A satellite has an additional image sensor An imaging satellite with a pointing system configured to change a position of a narrow field of view image sensor with regard to the surface of the Earth so that the image sensor perceives different portions of the Earth's surface when producing data or a series of images An imaging satellite with a pointing system that includes a gimbaled set wherein an optical telescope of a narrow field of view image sensor is pointed by adjusting the angle of the telescope relative to the body of the satellite An imaging satellite with a pointing system that includes a control mechanism configured to control an amount of spin imparted by a momentum or reaction wheel on the satellite so as to impart a relative rotation of the satellite with respect to the Earth and cause an optical path of the image sensor to change with respect to a predetermined spot on the Earth An imaging satellite with a sensor control and data processing system configured to semi-autonomously control a sensor, and produce fixed resolutions An imaging satellite with a sensor control and data processing system configured to semi-autonomously control a sensor, and produce variable resolutions An imaging satellite with a sensor control and data processing system configured to semi-autonomously control a sensor, and produce fixed frame rates An imaging satellite with a sensor control and data processing system configured to semi-autonomously control a sensor, and produce variable frame rates A sensor control and data processing system that monitors the saturation and pixel received energy levels of a sensor's focal plane array (FPA) and modifies the FPA's relevant operational parameters, to maximize the signal to noise ratio of the imagery generated A sensor control system that monitors a predefined subset of the pixels of each FPA A sensor control system that monitors all of the pixels of each FPA A sensor control and data processing system varies the frame rates of a FPA to optimize the imagery for transmission to the ground A sensor control and data processing system that varies the frame rates of a FPAs to allow for optimal low light imaging of objects and events on the ground and in the atmosphere under low light conditions A sensor control and data processing system that varies the frame rates of a plurality of FPAs to allow for optimal, concurrent high light imaging and low light imaging of objects and events on the ground and in the atmosphere under both high light and low light conditions A sensor control and data processing system that varies the frame rates of sub sections of a FPA to allow for optimal, concurrent high light imaging and low light imaging of objects and events on the ground and in the atmosphere under both high light and low light conditions A sensor control and data processing system producing imagery at full resolution of the entire observable hemisphere A sensor control and data processing system that produces imagery at full resolution of the field of view of the additional image sensors A data processing system combining imagery of full and lesser resolution images with the imagery from a narrow field image to provide data fused images An imaging satellite with a sensor control and data processing system that is programmed at any time through communications links from the ground control systems to produce images of fixed resolution An imaging satellite with a sensor control and data processing system that is programmed at any time through communications links from the ground control systems to produce images of variable resolutions An imaging satellite with a sensor control and data processing system that is programmed at any time through communications links from the ground control systems to produce images of fixed frame rates An imaging satellite with a sensor control and data processing system that is programmed at any time through communications links from the ground control systems to produce images of variable frame rate A sensor control and data processing system with ground control systems monitoring the saturation and pixel received energy levels of a FPAs and modifying the FPAs' relevant operational parameters A sensor control and data processing system commanded from the ground control systems to produce imagery at various resolutions A data processing system as commanded from the ground control systems produces imagery at full resolution of the entire observable hemisphere A processing system as commanded from the ground control systems produces imagery at full resolution of a select area of the observable hemisphere and reduced resolution imagery of the rest of the observable hemisphere A data processing system wherein the imagery of full and lesser resolution images is processed at different frame rates to optimize the imagery for transmission to the ground A data processing system wherein the imagery of full and lesser resolution images is processed at different resolution to optimize the imagery for transmission to the ground A data processing system wherein the lesser resolution imagery and full resolution imagery is selectively stored for future recall A data processing system wherein the imagery of full and lesser resolution images may be combined with the imagery from the narrow field imager to provide data fused images An imaging satellite with a sensor control and data processing system that includes a data compression mechanism configured to compress the data before transmitting the data to a remote location A data processing system of performing lossless compression A data processing system of performing variable bit rate compression A data processing system of performing lossy compression that preferentially is lossy in the lower order (least significant) bits of each pixel in an image A data processing system of performing an industry standard motion imagery lossy compression algorithm A imaging satellite with a transmitter is configured to transmit the data directly to a ground station A imaging satellite with a transmitter is configured to transmit the data directly to a user remote location A imaging satellite with a transmitter is configured to transmit the data directly to another imaging satellite to relay the imagery and data to a remote location A imaging satellite with a transmitter is configured to transmit the data directly to a network node configured to relay the imagery and data to a remote location by way of another satellite A imaging satellite with a transmitter is configured to transmit the data directly to a network node configured to relay said imagery and data to a remote location by way of the Internet An imaging satellite wherein the imaging satellite is one satellite of a constellation of at least three similar satellites in GSO An imaging satellite constellation the constellation supports imaging the same point on the Earth from more than one satellite of the constellation An imaging satellite system with a ground processing system configured to create images and motion imagery of the imagery and data A ground processing system configured to create images and full motion imagery in real-time A ground processing system configured to create images and full motion imagery in live A ground processing system performs data cumulation processing on the imagery to produce imagery of a quality better than the raw imagery A ground processing system that performs super resolution processing techniques A ground processing system derives trend or patterns of interest from the imagery and data A ground processing system that combines imagery from more than one satellite of a constellation A ground data processing system combining imagery from more than one satellite producing higher resolution imagery than is transmitted down from a satellite A ground data processing system combining imagery from more than one satellite to produce stereoscopic imagery A imaging satellite system with a ground processing system configured to extract signatures of interest from of the imagery A ground processing system combines imagery from external sources to extract events of interest A ground processing system combines imagery from external sources to extract patterns of interest An imaging satellite system comprising a high resolution display that is a surface of a sphere A high resolution display projected from the interior of a sphere onto the interior surface of that sphere A high resolution display system that is a set of plurality of projectors located at or near the center of the sphere to project onto the interior of the sphere A high resolution display system that includes a touch interface on the surface of the sphere to allow human interaction and direction of the way the imagery and data is displayed A high resolution display that is projected from the exterior of a sphere onto the exterior surface of that sphere using one or more projectors IV. Glossary ASIC, Application Specific Integrated Circuit
An integrated circuit (IC) designed, customized, and implemented for a particular use, rather than a generic designed IC intended for general-purpose use.

CCD, Charge Coupled Device Array
An image sensor implementing the movement of charge resulting from light falling onto the sensor's surface to another area of the device for readout.

CMOS Array, Complementary Metal-Oxide-Semiconductor Array
An image sensor implementing created using the same technologies as used to create typical integrated circuits (IC) chips.

Co-Collimated Telescopes
A set of two or more telescopes wherein all telescopes in the set are continuously pointed at, and focused on, the exact same region or object.

Data. Cumulation
A method of combining the data from multiple images to enhance the signal to noise ratio in the resulting image.

DSB-S2x, Digital Video Broadcasting—Satellite, Second Generation Extended
An industry standard Radio Frequency (RF) waveform modulation that implements a spectrally efficient, very high data and information rate communications.

Electronically Controllable High Refractive Index Material
A material that changes its index of refraction, and by this the path of light going through it, based upon the electrical voltage levels placed across the material.

FPGA, Field Programmable Gate Array
An integrated circuit designed to be configured by a customer or a designer after manufacturing—hence "field-programmable". The FPGA configuration is generally specified using a hardware description language (HDL). FPGAs can have their "programming" changed even after they are in an operational system such as a satellite already on orbit.

Focal Plane
The surface onto which an optical system, e.g., a telescope, focuses an image. A Focal Plane may be an imaginary surface in three dimensional space or the surface may be composed of one or more FPAs.

Focal Plane Array (FPA)
An array of elements, typically but not exclusive, within a single integrated circuit chip, designed to receive light and convert that light into electrical charges that can then be read out.

Frame Rate
The number of images (frames) recorded and read out by the image sensor per second. The standard frame rate in the U.S. for "full HDTV" is 30 frames per second.

Geostationary Orbit (GSO)
The orbit in the same plane as the Earth's equator at which an object in this orbit revolves around the Earth at the exact same rate as the Earth rotates on its axis. This is approximately 35,786 km above the Earth's surface at the equator. A Geostationary Orbit is a special case of a geosynchronous orbit.

Geosynchronous Orbit (GEO)
The orbit in which an object, such as a satellite, takes 24 hours to revolve around the Earth. This orbit has the object pass over the same point on the surface of the Earth every data at the same time every day.

Real-time v. Live

Live is defined as the end user being able to see an event in less than ten seconds after an event occurs. Real-time is defined as the end user being able to see an event in less than thirty seconds after an event occurs, including the aggregate of all durations for:
   light to get from the event to the sensor,
   the sensor to capture the light and create an electronic image,
   the sensor readout,
   the read out data processing,
   the transmission to a ground processing site,
   ground processing,
   distribution to the end user, and
   end user display.

SCOPE OF THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Real-time Satellite Imaging System have been disclosed above are intended to educate the reader about preferred embodiments of the invention, and are not intended to constrain the limits of the invention or the scope of Claims.

LIST OF REFERENCE CHARACTERS

ED Earth's disc
ES Earth's surface
FP Focal plane
JO Imaging optics
L Light rays
SC1 First scan
SC2 Second scan
SC3 Third scan
SC4 Fourth scan
SM Scanning mirror
SR Scan retrace
10 Real-time Satellite Imaging System
12 Satellite
14 Image Sensor
16 Transmitter
17 One embodiment of image sensor
18 Co-collimated telescopes
20 First refractive elements
22 Focal planes
24 Focal plane arrays
25 One embodiment of single co-collimated telescope
26 Reflective elements
28 Second refractive elements
30 Alternative embodiment of a single co-collimated telescope
32 Folding mirrors
34 Sensor image controller
36 Sensor image readout
38 Software controlled readout electronic elements
40 Image processor
42 Software controlled processing electronic elements
44 Transmitter
46 Method of the control of each focal plane array
48 Focal plane array sub-element
50 Sensor image controller
52 Field programmable gate arrays
54 Integration time per FPGA
56 Integration time segment of FPGA
58 Frame rate of FPGA
60 Sensor image readout that senses a maximum light level
62 Sensor readout that transmits a maximum light level
64 Image processing element
66 Method used process images and data from the sensor image readout to the image processor
68 Software controlled electronics processing elements
70 Element for processing compression
72 Element for formatting
74 View of use of plate
76 Plate
78 Incident light beams
80 Multiple paths of light beams
82 Exiting light rays
84 Voltage control element
86 First schematic diagram of plate
88 Second schematic diagram of plate
90 Schematic diagram of imaging sensor
92 Data and control flow diagram
94 Voltage control element
96 Software controlled electronics

What is claimed is:
1. An apparatus comprising:
   an image sensor;
   said image sensor including a plurality of co-collimated telescopes; said co-collimated telescopes being configured to produce a plurality of images of the same field of view;
   said image sensor being carried aboard a satellite in geostationary orbit;
   said image sensor being configured to be pointed generally toward Earth;
   said image sensor including a focal plane;
   said focal plane including a focal plane arrays;
   said focal plane arrays being configured to produce a plurality of data;
   said focal plane arrays being sparsely populated upon said focal plane of each of said co-collimated telescopes;
   each of said plurality of co-collimated telescopes being continuously pointed at, and focused on, the exact same region or an object;
   said plurality of focal plane arrays arranged in the primary focal plane of each of said co-collimated telescopes and not in secondary focal planes;
   each of said plurality of co-collimated telescopes directly illuminating one of said plurality of focal planes without an intermediary focal plane;
   each of said plurality of focal plane arrays being directly illuminated by each of said plurality of co-collimated telescopes in each of said focal planes and not in an intermediate focal plane;
   a sensor control and data processing system;
   said sensor control and data processing system for optimizing control functions;
   said sensor control and data processing system also for varying the frame rates of said plurality of focal plane arrays to allow for concurrent high light imaging and low light imaging of objects and events on the ground and in the atmosphere under both high light and low light conditions;
   said sensor control and data processing system also for monitoring the saturation and pixel received energy levels of each of said plurality of focal plane arrays;

said sensor control and data processing system also for modifying a plurality of relevant operational parameters of each of said plurality of focal plane arrays to maximize the signal to noise ratio of generated imagery;

said plurality of data including a plurality of images of a generally entire visible hemisphere of the surface of the Earth;

said plurality of data providing persistent imaging of said generally entire visible hemisphere of the surface of the Earth;

said plurality of images each being captured as full images substantially simultaneously;

said plurality of images each having resolutions that correspond with an image at nadir having at least one hundred meter resolution;

a plurality of sensor image controllers; said plurality of sensor image controllers being connected to one of said plurality of focal plane arrays;

each of said plurality of focal plane arrays being connected to and controlled by one of said plurality of sensor image controllers;

a plurality of software controlled electronics; each of said plurality of software controlled electronics being connected to one of said plurality of focal plane arrays;

each of said plurality of sensor image controllers using one of a plurality of software controlled electronics to control the operations of each of said plurality of focal plane arrays;

a plurality of sensor image readouts being connected to one of said plurality of focal plane arrays;

a plurality of software controlled readout electronic elements; said plurality of software controlled readout electronic elements being connected to one of said plurality of sensor image readouts;

said focal plane array being read out by one of said plurality of said sensor image readouts: each of said plurality of sensor image readouts including a plurality of software controlled readout electronic elements:

each of said plurality of said focal plane arrays including a plurality of focal plane array sub-elements:

a plurality of field programmable gate arrays (FPGA) elements;

said plurality of FPGA elements being connected to one of said plurality of focal plane arrays:

each of said plurality of focal plane arrays being controlled by one of said plurality of FPGA elements;

a plurality of field programmable gate arrays;

each of said plurality of field programmable gate arrays including one of said plurality of a sensor image readouts;

said plurality of field programmable gate arrays sensing a maximum light level and and transmitting a maximum light level to the sensor image control to optimize the capture of said plurality of images;

said sensor image readout transferring said plurality of images and said plurality of data from said focal plane array to one of said image processing elements:

said plurality of focal plane arrays producing said plurality of images and said plurality of data:

software controlled processing element;

said software controlled processing element being connected to said image processor;

said plurality of images and said plurality of data being transferred to an image processor; said image processor including a plurality of software controlled processing electronic elements: and a transmitter; said transmitter being connected to said plurality of software controlled processing elements; said plurality of images and said plurality of data being conveyed to said transmitter for forwarding to a user.

2. An Apparatus as recited in claim 1, in which said image sensor is a staring sensor.

3. An Apparatus as recited in claim 1, in which each of said plurality of focal plane arrays is connected to a field programmable gate array.

4. An apparatus comprising:

an image sensor;

a focal plane array;

said image sensor including a telescope; said telescope being configured to produce an image of the field of view;

said image sensor including an electrically reactive material plate;

a plurality of sensor image control elements;

said image sensor including one of said plurality of sensor image control element;

each of said plurality of sensor image control elements including a voltage control element;

said voltage control element being configured to apply a plurality of different voltages across said electrically reactive material plate;

said electrically reactive material plate altering the direction of a plurality of light rays illuminating each of said plurality of focal plane arrays;

said image sensor being carried aboard a satellite in geostationary orbit;

said image sensor being configured to be pointed generally toward Earth;

said image sensor including a focal plane;

said focal plane including a plurality of focal plane arrays;

each of said plurality of focal plane arrays being configured to produce a plurality of data;

said plurality of data providing persistent imaging of at least a portion of said generally visible hemisphere of the surface of the Earth;

said image being captured as a full image substantially simultaneously;

said plurality of images each having resolutions that correspond with an image at nadir having a resolution of at least hundred meters;

a plurality of co-collimated telescopes; each of said plurality of co-collimated telescopes being continuously pointed at, and focused on, the exact same region or object;

said plurality of focal plane arrays arranged in a primary focal plane of each of said co-collimated telescopes and not in secondary focal planes;

each of said plurality of co-collimated telescopes directly illuminating one of said plurality of focal planes without an intermediary focal plane;

each of said plurality of focal plane arrays being directly illuminated by each of said plurality of co-collimated telescopes in each of said focal planes and not in an intermediate focal plane;

a sensor control and data processing system;

said sensor control and data processing system for optimizing control functions;

said sensor control and data processing system also for varying the frame rates of said plurality of focal plane arrays to allow for concurrent high light imaging and low light imaging of objects and events on the ground and in the atmosphere under both high light and low light conditions;

said sensor control and data processing system also for monitoring the saturation and pixel received energy levels of each of said plurality of focal plane arrays;

said sensor control and data processing system also for modifying a plurality of relevant operational parameters of each of said plurality of focal plane arrays to maximize the signal to noise ratio of generated imagery;

a plurality of sensor image controllers; said plurality of sensor image controllers being connected to one of said plurality of focal plane arrays;

each of said plurality of focal plane arrays being connected to and controlled by one of said plurality of sensor image controllers;

a plurality of software controlled electronics; each of said plurality of software controlled electronics being connected to one of said plurality of focal plane arrays;

each of said plurality of sensor image controllers using one of a plurality of software controlled electronics to control the operations of each of said plurality of focal plane arrays;

a plurality of sensor image readouts being connected to one of said plurality of focal plane arrays;

a plurality of software controlled readout electronic elements; said plurality of software controlled readout electronic elements being connected to one of said plurality of sensor image readouts;

each of said focal plane arrays being read out by one of said plurality of said sensor image readouts; each of said plurality of sensor image readouts including a plurality of software controlled readout electronic elements:

each of said plurality of said focal plane arrays includes a plurality of focal plane array sub-elements:

a plurality of field programmable gate arrays elements; said plurality of field programmable gate arrays elements being connected to one of said plurality of focal plane arrays;

each of said plurality of focal plane arrays being controlled by one of said plurality of field programmable gate arrays elements;

a plurality of field programmable gate arrays; said plurality of field programmable gate arrays being connected to said plurality of focal plane arrays;

each of said plurality of field programmable gate arrays including one of said plurality of a sensor image readouts;

said plurality of field programmable gate arrays sensing a maximum light level and transmitting a maximum light level to the sensor image control to optimize the capture of said plurality of images each of said plurality of said sensor image readouts transferring said plurality of images and said plurality of data from one of said plurality of focal plane arrays to one of said image processing elements;

said plurality of focal plane arrays producing said plurality of image and said plurality of data;

a plurality of software controlled processing elements: said software controlled processing elements being connected to said image processor;

said plurality of images and said plurality of data being transferred to an image processor;

said image processor including plurality of software controlled processing electronic elements;

a pair of plates: said pair of plates being connected to said plurality of co-collimated telescopes;

said plates being formed from an electrically reactive high index of refraction material:

said plates being illuminated by incident light beams;

a voltage control element; said voltage control element being connected to said pair of plates;

said plurality of images produced by said plurality of focal plane arrays being actively shifted in two dimensions; and a transmitter; said transmitter being connected to said plurality of software controlled processing elements;

said plurality of images and said plurality of data being conveyed to said transmitter for forwarding to a user.

5. An Apparatus as recited in claim 4, in which said image sensor is a staring sensor.

6. An Apparatus as recited in claim 4, in which each of said plurality of focal plane arrays is connected to a field programmable gate array.

* * * * *